United States Patent

[11] 3,614,657

[72] Inventor Shuzo Hattori
 Nagoyashi, Japan
[21] Appl. No. 418,764
[22] Filed Dec. 16, 1964
[45] Patented Oct. 19, 1971
[73] Assignee Nihon Denshi Kabushiki Kaisha
 Tokyo, Japan
[32] Priority Dec. 27, 1963
[33] Japan
[31] 38/70626

[54] CYLINDRICAL PLASMA LASER
 8 Claims, 3 Drawing Figs.

[52] U.S. Cl. ..................................... 331/94.5
[51] Int. Cl. ..................................... H01s 3/09
[50] Field of Search ........................... 331/94.5;
 330/4.3

[56] References Cited
UNITED STATES PATENTS
3,209,281 9/1965 Colgate et al. ............... 331/94.5

OTHER REFERENCES

Javan: " Possibility of Obtaining Negative Temperature in Atoms by Electron Impact," Quantum Electronics, ed. by Townes, Columbia University Press, New York, 1960, pp. 564–571

Primary Examiner—William L. Sikes
Assistant Examiner—Edward S. Bauer
Attorney—Webb, Burden, Robinson & Webb ABSTRACT: An apparatus and method for obtaining high power output oscillations from a gas laser by subjecting the gas to a magnetic field parallel to the axis of a tube containing the gas and to electromagnetic oscillations in a direction perpendicular to the longitudinal axis of the tube to produce a cylindrical plasma. The intensity of the magnetic field (H) and the frequency of the electromagnetic oscillations (f) being expressed by the general formula:
$f = eH/2\pi mc$, wherein
$e$ = the electric charge of the gas particles,
$m$ = the average mass of the particles, and
$c$ = the velocity of light.

PATENTED OCT 19 1971

3,614,657

INVENTOR.
Shuzo Hattori
BY
Webb, Burden, Robinson & Wall
Attorneys

CYLINDRICAL PLASMA LASER

This invention relates to a method and apparatus for obtaining high-power-output oscillations from a gas laser (or maser). In conventional apparatus, such as an oscillation tube that contains a mixture of neon and helium gas, when the electrodes of the oscillation tube are excited by high frequencies, gaseous atoms in the tubes are excited in such a manner as to be elevated to a high energy level.

Figure 1:
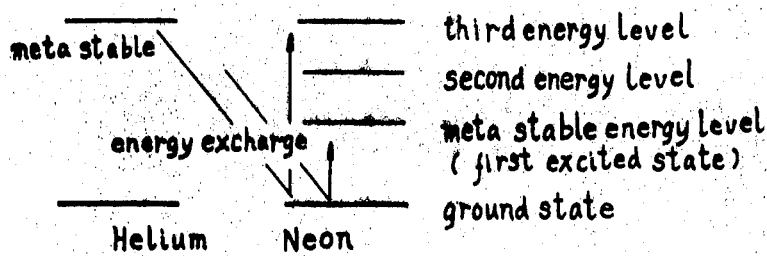

This phenomenon is best described by referring to FIG. 1 which illustrates the energy displacement of helium and neon atoms. Excited helium atoms tend to return from a meta stable energy level to a more stable energy level. Neon atoms in a ground state level of stability absorb energy released by the helium atom during their transformation and are displaced upwardly to a third energy level. This results in a greater number of atoms reaching the third energy level than reached the second energy level. Since this condition is unstable, the neon atoms in the third energy level fall down to a more stable energy level until a balanced thermal equilibrium is restored. Oscillation occurs in this manner.

In the above description, it is shown that neon atoms are displaced from the ground state energy level up to the third energy level as a result of an energy exchange between helium atoms in a meta stable level and neon atoms in a ground state energy level. However, at the electron temperature of high power output oscillations, the number of neon atoms in the meta stable level (first excited state) increases due to collisions with electrons. The increase of neon atoms in the meta stable level causes an increase in the number of atoms in the second energy level at the same time due to the tendency of the atoms to keep thermal equilibrium. As a consequence, even if the number of neon atoms reaching the third level increases, displacement of these atoms to the second energy level does not correspond to the increase due to the thermal equilibrium conditions. Thus, it is difficult to obtain powerful high-output oscillations by conventional methods and apparatus.

The present invention overcomes the above-recited difficulties and provides a novel and efficient method and apparatus for obtaining powerful high-output oscillations by the laser (or maser) gas principle.

Figure 2:
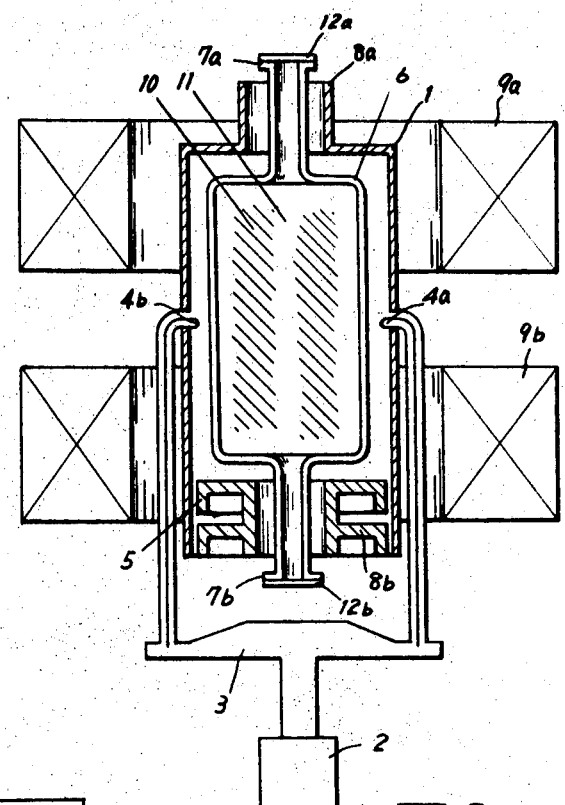
Figure 3:
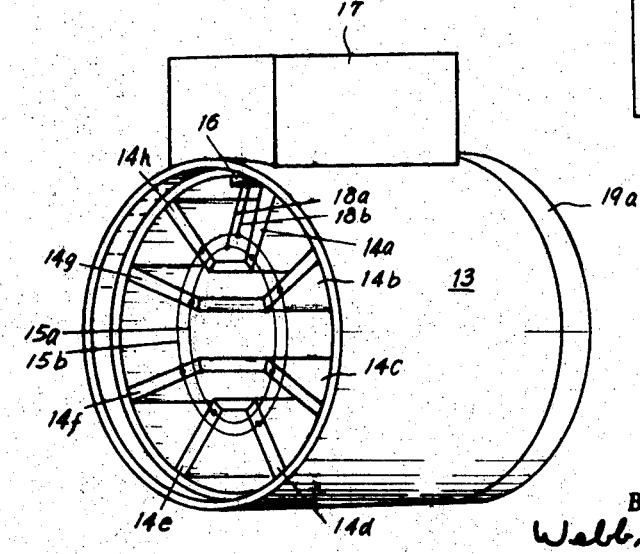

In the accompanying drawings, I have shown preferred embodiments of my invention in which:

FIG. 1 is a schematic diagram illustrating the energy level of helium and neon atoms;

FIG. 2 is an illustrative cross-sectional view of a resonator that embodies the features of the present invention. This figure shows the utilization of excited atoms or molecules in the afterglow region generated as a result of microwave discharge under cyclotron resonance conditions; and FIG. 3 is a perspective view of another embodiment of the present invention employing the same phenomenon as that of the apparatus of FIG. 2. This figure shows the utilization of excited atoms or molecules as a result of microwave discharge while employing a magnetron.

In FIG. 2, cylindrical resonator 1 is of $TE_{011}$ mode. A high-voltage microwave oscillator 2 provides microwaves in the cavity of the resonator by way of coupling loops 4a and 4b through a separating circuit 3. A cylindrical electrostatic field is obtained in the cavity resonator.

A floating short circuit plate 5 arranged under the cavity resonator prevents undesirable excitation by a different mode.

An oscillation tube 6 constructed of a material such as fused quartz contains a gas mixture of neon and helium. Pipes 7a and 7b of tube 6 are connected to the cavity resonator at their ends and protrude through cylindrical wave guides 8a and 8b. These wave guides serve to prevent the microwaves from leaking out.

Coils 9a and 9b provide a magnetic field about the axis of the cylindrical cavity resonator. The intensity of magnetic field $H$ and the microwave frequency $f$ must be adjusted to substantially meet the relationship expressed by the formula:

$$f = \frac{e}{2\pi mc} H$$

Where $e$ is the electric charge of the particles (ionized atoms or molecules of gas), $m$ is the mass of the particles, and $c$ is the velocity of light.

In general, it is known that where low gas pressures are employed, high electric voltage is necessary for maintaining a discharge. However, where microwaves are discharged while subjected to the influence of cyclotron resonance, a high electric voltage such as described above is unnecessary and a state of discharge is readily maintained with comparatively low current densities because diffusion of electrons in the direction perpendicular to that of the magnetic field is prevented as a result of the motion or influence of the cyclotron resonance.

Furthermore, although the electron temperature in the plasma rises to a higher level, the Q value of the cavity resonator is not lowered because of anistrophy of heat conduction in a plasma.

Thus, it will be seen that a cylindrical plasma such as that shown by the numeral 10 in FIG. 2 which has a hollow space 11 can be utilized in carrying out effective oscillations. Oscillated rays having a fixed wavelength are amplified between mirrors 12a and 12b of a Fabry Perot resonator and, consequently, laser (or maser) oscillations will occur.

In the description of the above embodiment of my invention, it is shown that a cylindrical plasma can be made by discharging microwaves in a low gas pressure while employing a magnetic field under the influence of a cyclotronic resonance.

On the other hand, where microwaves are discharged in a high gaseous pressure, a plasma is also readily created because ionized nuclei and electrons cannot be diffused. Thus, a magnetron may be employed to effectively obtain a cylindrical plasma which will accomplish the principles of the present invention.

In carrying out the embodiment of FIG. 3, a magnetron is employed that differs structurally from magnetrons of conventional construction. The present magnetron is designed for the single purpose of creating a cylindrically shaped plasma and, accordingly, structures such as negative electrodes that are employed in the conventional apparatus are omitted as unnecessary. We utilize a principle of effecting microwave discharge between adjoining electrodes.

In FIG. 3 there is shown a magnetron having a cylindrical envelope 13 with electrodes 14a, 14b, 14c, 14d, 14e, 14f, 14g, and 14h radially mounted within. These electrodes are alternately divided into a group of electrodes 14b, 14d, 14f and 14h connected by a lead 15b and a group of electrodes 14a, 14c, 14e and 14g connected by a lead 15a, respectively. Leads 15a and 15b are attached to antennas 18a and 18b, respectively, which protrude from a wave guide 17 through a slit 16. Microwaves from an oscillator (not shown) are supplied to the electrodes by way of waveguide 17, antennas 18a and 18b and leads 15a and 15b. The ends of envelope 13 are tightly enclosed by reflecting mirrors one of which is indicated at 19a and the other of which is omitted from FIG. 3 and the envelope 13 is filled with a gaseous mixture such as neon and helium.

By employing the construction of FIG. 3 when the respective electrodes are supplied with microwave power, microwave discharge occurs between the adjoining electrodes and a cylindrical plasma that is substantially the identical to that of the apparatus of FIG. 2 is created. Neon atoms at ground state energy levels in the hollow space of the tube which is electrically neutral are excited as a result of energy exchange with helium atoms displaced from their meta stable energy level. As a consequence, energy displacement of neon from the third energy level to the second energy level proceeds smoothly and extremely high output oscillations are obtainable.

In the embodiment of FIG. 3 which utilizes the discharging of a magnetron, a magnet is unnecessary and, accordingly, it is possible to reduce the size of the apparatus to a considerable degree. Additionally, construction of the device is greatly simplified.

In this invention, we can in practice obtain efficiencies in excess of about $10^{13}$ at a high power output which is the highest obtained so far in this field. It is difficult to obtain efficiencies greater than about $10^{15}$ in conventional apparatus.

While I have described the presently preferred embodiments of my invention, it is to be understood that it may be otherwise embodied within the scope of the following claims.

I claim:

1. A method for the production of laser output oscillations utilizing a gaseous mixture contained in a cylindrical oscillation tube having reflecting mirrors at its longitudinal ends comprising:
   A. subjecting the gas to a magnetic field parallel to the axis of said tube to produce cyclotron resonance in the gas particles; and
   B. simultaneously subjecting the gas to microwave oscillations in a direction perpendicular to the axis of said tube to obtain a cylindrical plasma, the axis of which is perpendicular to said reflecting mirrors, whereby oscillated rays of a fixed wave length are amplified between said mirrors.

2. A method as set forth in claim 1 wherein the relationship between the intensity of said magnetic field and the frequency of said microwave oscillations is $f = eH/2\pi mc$ where, $f = eH/2\pi mc$, wherein
$e$ = the electric charge of the gas particles,
$m$ = the average mass of the particles, and
$c$ = the velocity of light.

3. Apparatus for the production of laser output oscillations comprising:
   A. a substantially cylindrical oscillation tube containing a gaseous mixture, and enclosed at its longitudinal ends by laser-emission-reflecting mirrors:
   B. a resonator enclosing said oscillation tube;
   C. means for providing microwave oscillations to said gaseous mixture to create a cylindrical plasma with an axis perpendicular to the face of the said mirrors; and
   D. means for creating a magnetic field parallel to the axis of the tube to subject the mixture to cyclotron resonance.

4. Apparatus as set forth in claim 3, wherein said resonator is a cylindrical cavity resonator and said oscillation tube is positioned within the cavity of said resonator.

5. Apparatus as set forth in claim 4 wherein the cavity resonator is of $TE_{011}$ mode.

6. Apparatus for the production of laser output oscillations comprising:
   A. a cylindrically shaped magnetron having a gaseous mixture contained therein and laser-Wave-emission-reflecting mirrors closing its ends;
   B. a plurality of spaced elongated electrodes attached to said magnetron and extending radially toward the central axis of said magnetron and terminating in spaced relationship with said central axis; and
   C. means for providing a microwave discharge between adjoining electrodes to form a cylindrical plasma along the central axis of said magnetron.

7. Apparatus as set forth in claim 6 wherein said plurality of electrodes are alternatively divided into two groups; a pair of antennas; means connecting one of said antennas to each electrode in one of said groups; and means for supplying microwaves to said antennas, whereby the microwave discharge occurs between adjoining electrodes to create said cylindrical plasma.

8. An electron cyclotron resonance-pumped gaseous laser comprising a gas-filled laser tube having reflecting means at each end thereof for reflecting at least a portion of electromagnetic radiation impinging thereon therebetween, means for applying a steady magnetic field to the gas in said laser tube, whereby free electrons present in said gas have a predetermined cyclotron frequency which is a function of the strength of said steady magnetic field, and pumping means coupled to the gas in said tube for applying electromagnetic oscillations thereto having a frequency substantially identical to said predetermined cyclotron frequency.

UNITED STATES PATENT OFFICE
CERTIFICATE OF CORRECTION

Patent No. 3,614,657          Dated  October 19, 1971

Inventor(s)          Shuzo Hattori

It is certified that error appears in the above-identified patent and that said Letters Patent are hereby corrected as shown below:

Column 3, line 2, "$10^{13}$" should read -- $10^{-3}$ --; line 4, "$10^{15}$" should read -- $10^{-5}$ --. claim 2, Column 3, line 25, "$f=eH/2\pi$ mc, wherein," should read -- f=frequency of microwave oscillations, --. In claim 2 immediately following "e=the electric charge of the gas particles," insert -- H= the intensity of the magnetic field, --.

Signed and sealed this 11th day of April 1972.

(SEAL)
Attest:

EDWARD M. FLETCHER, JR.
Attesting Officer

ROBERT GOTTSCHALK
Commissioner of Patents